6485X
J. Patridge,
Making Wooden Trays, &c.
Patented Apr. 16, 1831.
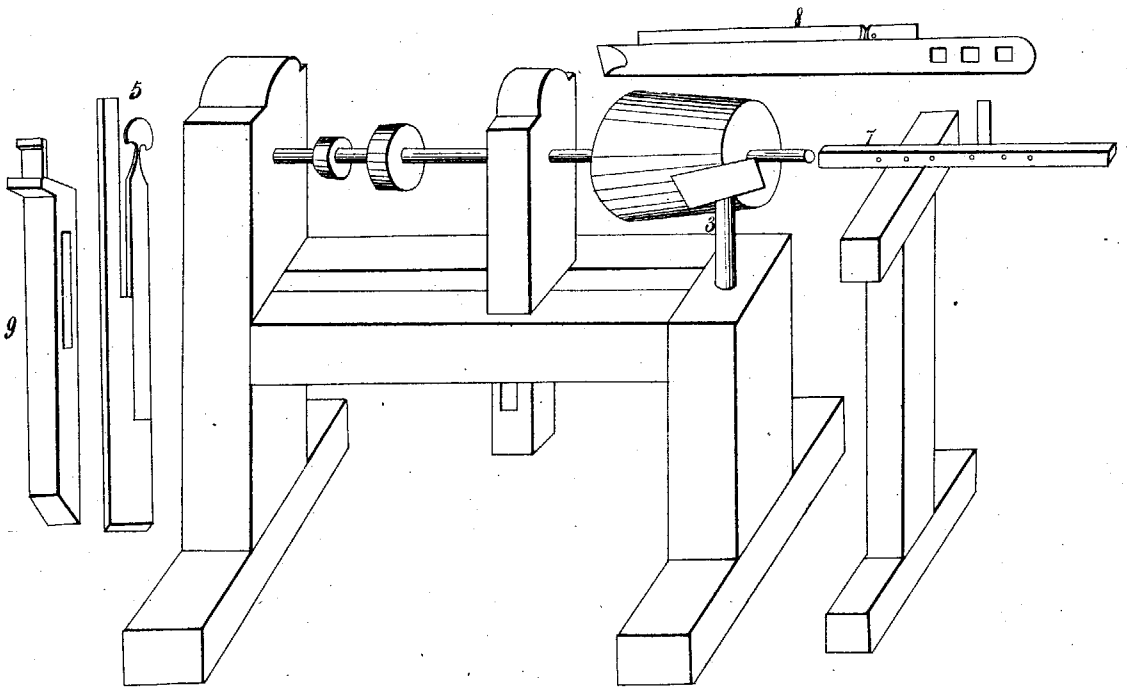
AM. PHOTO-LITHO. CO. N.Y. (OSBORNE'S PROCESS)

6485x April 16.1831

John Partridge of Zanesville Ohio

Letters Patent

The Schedule referred to in these Letters Patent and making part of the same containing a description in the words of the said John Partridge himself of his improvement in the manufacture of wooden Ware without Staves.

To all to whom these presents shall come; Be it known that I John Partridge of Zanesville in the County of Muskingum, and State of Ohio, have invented a new and useful improvement in the manufacture of wooden ware without staves, such as Tubs. Buckets. Keelers. Churns. Kegs. Barrels &c, and that the following is a full and exact description of the construction and operation of the said machine as invented, or improved by me. A Common Lathe of heavy timber built in the most substantial manner (requiring Steam or Water power) proportioned as represented by the Drawing. The block in its rough State, first necessarily perforated through the centre with a hole of suitable size in order to be fixed on the mandrill, and turned in the usual way with the small end next the guide (7) The gage gouge is then placed on the rest (3) and the guide (7) regulating the tool by the guide to the bevil of the block. the operation of cutting the rims of the ware is then commenced by sliding the tool up to the block, the entering of the tool is regulated by the end of the stock, next the gouge forming a gage, which can be altered at pleasure to suit the thickness wanted for the rims, as represented in figure (8). When this operation is performed, the cutting of the crose (groove for the bottom) is next done, the small end of the Vessel being next the rest (3) by inserting a tool made for that purpose as shown in the drawing fig 9. It is now finished with the exception of cutting through with a chisel at the distance from the end, where the crose was cut, to suit the size of the ware.

6485x Apl. 16, 1831

The rim is now completed, and slips off in a state ready for putting in the bottom. The gage gouge in its progress cutting each side perfectly smooth rendering any other operation unnecessary: Proceeding in the same manner the next in size is cut, and so on "till the whole block is finished forming a nest ware of the largest size down to the smallest. By commencing at the small end of the Block and dispensing with a screw head, every piece of ware as finished slips off saving the time of unscrewing and taking the block out of the Lathe for every single rim that is turned. By commencing at the small end, the timber at the large end is saved for another rim, as the block is sufficiently long to make four two feet pieces of the smaller ware. a considerable saving of labor and timber. The gage gouge is formed of a piece of iron three eighths of an inch thick, one and a half inch wide and two feet in length, narrowing towards the end, the gouge is placed both in width and thickness. the gouge forming a little more than half a circle as figure 8 and placed nearly perpendicular as represented by fig. 5. The upper corners slightly rounded off. The iron plate being fastened to the centre leaving a space on each side of the plate in the hollow of the gouge as fig 8. three holes made at the other end to receive the bolts of the stock or handle in order to be secured fast: The gage is secured on the upper edge of the plate by a piece secured on near the bolt holes and connected with the gage by a hinge. the end near the gouge is fastened down with a screw. The gage gouge is secured in the stock or handle by three bolts as shown in the drawing. The crosier or tool for cutting the croze (groove for the Bottom) is similar to a Spur Rabbit Plane with a gage to regulate the distance from the edge of the rim as represented by figure 9. a left handed gage gouge; and a left handed crosier are also used, being necessary in turning the rims of churns kegs barrels &c.

I claim as my invention the manner of fixing the block in the Lathe, the application of the gage gouge and crosiers

6485x Apl 16, 1831 83 at each end of the rim, the sawing operation of labor, and sawing of timber, the gage gouge and crodin (tool for cutting the groove) to receive the bottom. Janesville Dl. Oct 1830.

Witnesses
Saml. Thompson
Daniel Evans
Charles Helton

John Partridge

Exd.
M.P.C.